United States Patent [19]
Padlo

[11] Patent Number: 5,673,959
[45] Date of Patent: Oct. 7, 1997

[54] FOLDABLE CONVERTIBLE FLEXIBLE-ROOF SUPPORT

[76] Inventor: Craig W. Padlo, 6947 White Pines Dr., Brighton, Mich. 48116

[21] Appl. No.: 345,936

[22] Filed: Nov. 28, 1994

[51] Int. Cl.⁶ .................................................. B60J 7/12
[52] U.S. Cl. .................................... 296/116; 296/114
[58] Field of Search ............................. 296/107, 109, 296/114, 116

[56] References Cited

U.S. PATENT DOCUMENTS

| | | |
|---|---|---|
| 1,808,298 | 6/1931 | Du Pont . |
| 2,580,337 | 12/1951 | Votypka . |
| 2,682,427 | 6/1954 | Bright ........................... 296/107 X |
| 2,697,633 | 12/1954 | Slason . |
| 2,864,388 | 12/1958 | Oliver . |
| 3,536,354 | 10/1970 | Ingram ........................... 296/107 X |
| 3,994,524 | 11/1976 | Lehmann . |
| 4,066,292 | 1/1978 | Carli . |
| 4,260,188 | 4/1981 | Bauer . |
| 4,729,593 | 3/1988 | Nisiguchi et al. . |
| 4,828,317 | 5/1989 | Muscat ........................... 296/116 X |
| 4,850,634 | 7/1989 | Taubitz . |
| 4,927,202 | 5/1990 | Wagner . |
| 5,004,291 | 4/1991 | Bauer et al. ........................... 296/116 |
| 5,042,868 | 8/1991 | Nothaft et al. ........................... 296/107 |
| 5,072,987 | 12/1991 | Allen . |
| 5,299,850 | 4/1994 | Kaneko et al. ........................... 296/107 |

FOREIGN PATENT DOCUMENTS

| | | |
|---|---|---|
| 0146884 | 7/1985 | European Pat. Off. . |
| 2639292 | 11/1988 | France . |
| 198586 | 6/1938 | Germany . |
| 3807694 | 9/1989 | Germany . |
| 4015939 | 11/1990 | Germany . |
| 558166 | 3/1993 | Japan . |

Primary Examiner—Joseph D. Pape

[57] ABSTRACT

A flexible-roof support for a vehicle. The vehicle has a door opening on each side, each door opening having an upper part. The flexible-roof support includes two side bows, each side bow having a short leg, a long leg, and an elbow where the short and long legs are connected, and distal ends opposite the elbow. The distal ends of the short legs are pivotally attachable to the vehicle above the belt line and behind the door openings, such that the side bows are alignable with the sides of the vehicle and the long legs of the side bows are alignable with the upper part of the door openings. Another embodiment is a flexible-roof support which includes a front bow, two front bow arms, each front bow arm having two ends and, two bow pivots, such that the support may be folded back to form a sun roof, to the flexible-roof support or to a portion of the flexible roof which remains over the passenger compartment. The front bow has a member which substantially spans the width of the vehicle and has two ends. Each end of the front bow is connected to an end of one of the front bow arms. At the other end of each of the front bow arms, A bow pivot is connected.

17 Claims, 4 Drawing Sheets

FOLDABLE CONVERTIBLE FLEXIBLE-ROOF SUPPORT

BACKGROUND OF THE INVENTION

1. Field of the Invention

The present invention relates generally to foldable convertible flexible-roof supports and, more particularly, to foldable convertible flexible-roof supports for utility vehicles.

2. Description of the Related Art

Some utility vehicles have convertible flexible roofs supported by supports which allow the roof to be converted from the closed position to the open position and vice versa. Such convertible roofs are traditionally converted to the open position by either removing the roof from the vehicle or by folding the roof back. It is usually preferred that the roof be capable of being folded back instead of requiring removal, as removal of the roof calls for a place for storage and, if the roof is left at home, the driver may be without a roof in inclement weather.

Although many different flexible-roof supports exist today, the supports are often difficult to manufacture due to the number of parts required and the close manufacturing tolerances needed in order to fit and function on the vehicle. Therefore, there remains a need for an improved foldable flexible-roof support which is adjustable so that it allows high manufacturing tolerances, allowing for some variation in size and shape of the parts of the flexible-roof support and/or the vehicle. Furthermore, when the flexible-roof support is designed to allow for higher tolerances, assembly of the support is made easier. In addition, many conventional flexible-roof supports are difficult to use and obstruct the driver's view when in the closed position, open position, or both.

It is an object of the present invention to provide a convertible foldable support for a flexible roof for a utility vehicle, or any vehicle which has a structural member which can receive the mounting bracket of the present invention, as described more hereinafter.

It is yet another object of the present invention to provide a foldable convertible flexible-roof support which has a low number of parts and allows for high manufacturing tolerances so that it is easy to manufacture and easy to assemble.

It is still another object of the present invention to provide a foldable convertible flexible-roof support which minimally obstructs the driver's view while either in the open or closed position.

SUMMARY OF THE INVENTION

To achieve the foregoing objects, one embodiment of the present invention is a foldable convertible flexible-roof support for a utility vehicle, the vehicle having a body, a belt line where the flexible roof meets the vehicle body, two sides with two side members to receive a mounting bracket, and a door opening on each side of the vehicle. Each door opening has an upper part.

Basically, the invention includes a flexible-roof support with at least one L-shaped side bow, and a mounting bracket which can be mounted on side structural members of the vehicle, such as "roll bars", "sport bars", "baskethandles", or any other such structural members. The mounting bracket of the present invention includes a configuration such that the at least one L-shaped sidle bow can be mounted thereon in a manner to allow for nearly 180° pivoting so that the L-shaped side bow can flip from an "up" position to a "down" position where the L-shaped side bow may be tucked away under the belt line within the vehicle body to give zero clearance.

Therefore, one of ordinary skill in the art would be able to apply the concept of the present invention to many vehicles, including "Jeep"-types ("Jeep" is a registered trademark of Chrysler Corporation, Auburn Hills, Mich.), and passenger cars with side structural members, such as certain "Cutlass" cars ("Cutlass" is a registered trademark of Oldsmobile Corporation of Flint, Mich.). Also one can see that the number of L-shaped bows may vary depending on the length of the vehicle, etc. The corresponding mounting bracket must be able to accommodate greater numbers of L-shaped bows.

The preferred flexible-roof support includes at least two L-shaped side bows, each L-shaped side bow having a short leg, a long leg connected to the short leg, and an elbow where the short and long legs are connected. The long and short legs each have a distal end opposite the elbow. The distal ends of the short legs of the side bows are pivotally attachable to the vehicle above the belt line and behind the door openings of the vehicle, such that the side bows are alignable with the sides of the vehicle and the long legs of the side bows are alignable with the upper part of the door openings. Although there may be several variations on the theme, one of ordinary skill in the art may find any one of them to be useful depending on which vehicle is being fitted. Shorter vehicles may only require one L-shaped bow in order to support a flexible roof, while longer vehicles may require more bows.

Another embodiment of the present invention is a flexible-roof support for supporting a flexible roof on a utility vehicle wherein the flexible roof is capable of covering the entire passenger compartment. This flexible-roof support has very few parts, and does not obstruct the driver's view. In this embodiment, the flexible-roof support includes a front bow, two elongated front bow arms, each front bow arm having two ends, and two bow pivots. In the industry, these bows are referred to as 1-bow (front bow), 2-bow (intermediate bow), and etc. Some vehicles require 4-bow and 5-bow configurations. One of ordinary skill in the art would know which configuration would be necessary for a particular application.

The front bow has a transverse member which substantially spans the width of the vehicle and has two ends. Each end of the front bow is connected to an end of one of the front bow arms. At the other ends of each of the front bow arms, a bow pivot is connected. The front bow arms and the bow pivots are present so that the front bow may be folded back creating a sun roof on the vehicle. The flexible-roof support may further include means for attaching the front bow, when the front bow is folded back, to the flexible-roof support which remains over the passenger compartment or to a portion of the flexible roof which remains over the passenger compartment.

Other objects, features, and advantages of the present invention will be readily appreciated as the same becomes better understood after reading the subsequent description taken in conjunction with the appendant drawings.

DESCRIPTION OF THE PREFERRED EMBODIMENT(S)

Figure 1:
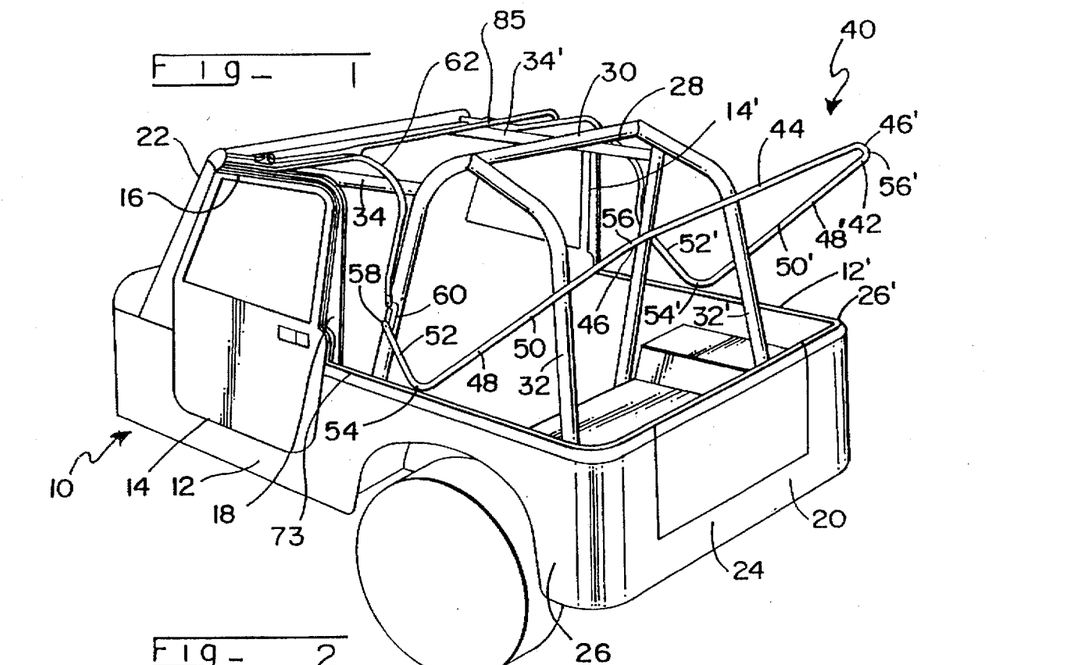
FIG. 1 is a perspective view of a utility vehicle, in part, having thereon a foldable convertible flexible-roof support according to the present invention, the flexible-roof support being in the closed position.

Referring first to FIG. 1, a utility vehicle is partially shown and designated by reference numeral 10. Vehicle 10 has two sides 12 and 12', each side having a door opening, 14 and 14', respectively. Each door opening 14 and 14' has an upper part. Door opening 14 is shown having upper part 16 and door frame 18. Vehicle 10 further has a front end (not shown in its entirety) and rear end 20. Near the front end, vehicle 10 has windshield frame 22, and at rear end 20, vehicle 10 has rear panel 24 connecting two side panels 26 and 26'.

Vehicle 10 further has a sports bar 28 attached to the vehicle. Sports bar 28 includes C-shaped bar 30 extending from side 12 to side 12' such that the ends of the "C" extend downwardly and are attached to vehicle 10 near the middle of the vehicle and the arch of the "C" extends upwardly from vehicle 10. Sports bar 28 further has two arcuate bars 32 and 32' each attached, at one end, to the arch of C-shaped bar 30 and, at the other end, to vehicle 10 near rear end 20.

Vehicle 10 further has cage support bars 34 and 34', one on each side of the vehicle, each one extending from near the top of C-shaped bar 30 to near windshield frame 22.

Figure 2:
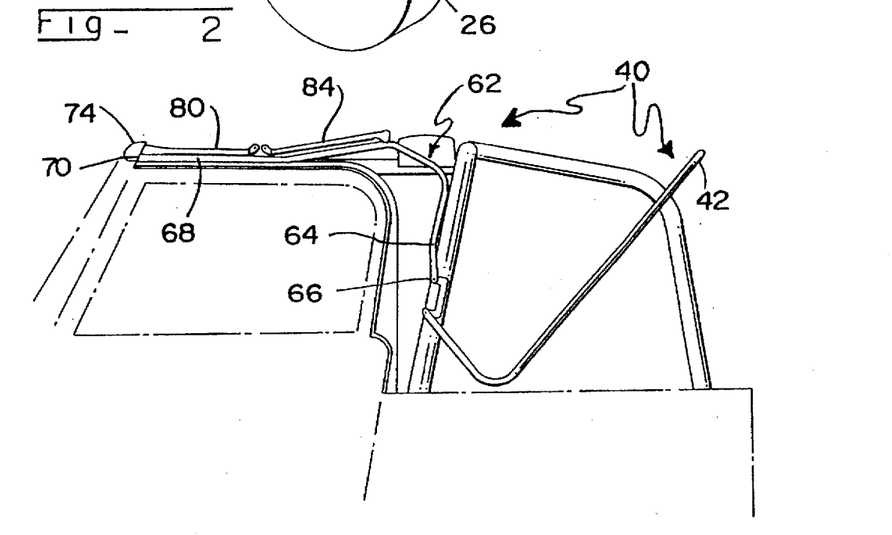
FIG. 2 is a side view of part of the utility vehicle of FIG. 1.
Figure 3:
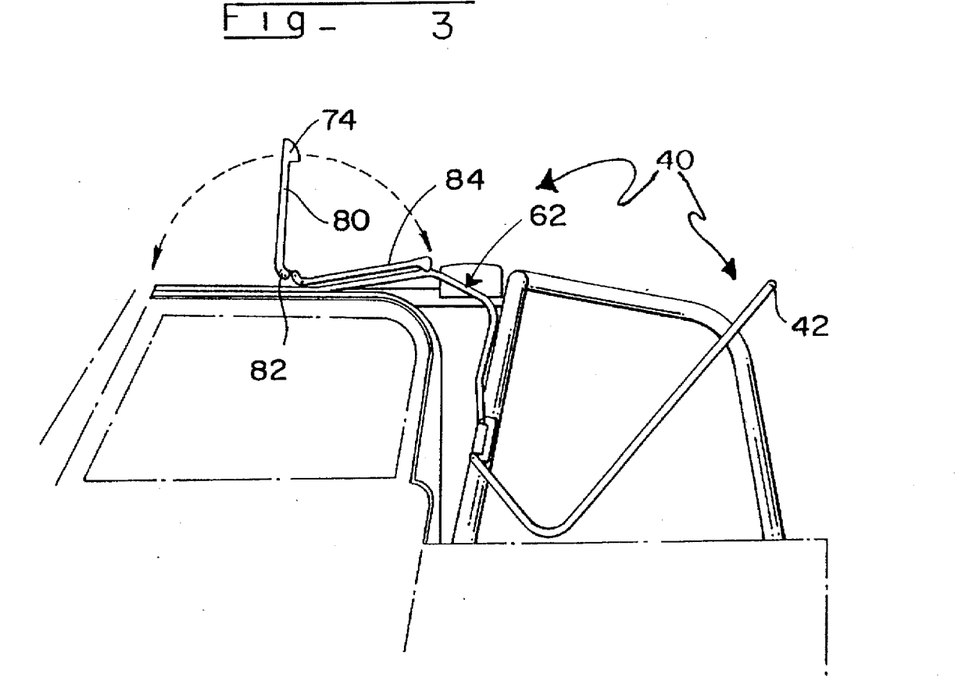
FIG. 3 is a side view of part of the utility vehicle of FIG. 1 in which the flexible-roof support is partially open which effectively is equivalent to having a sun roof in the roof.
Figure 4:
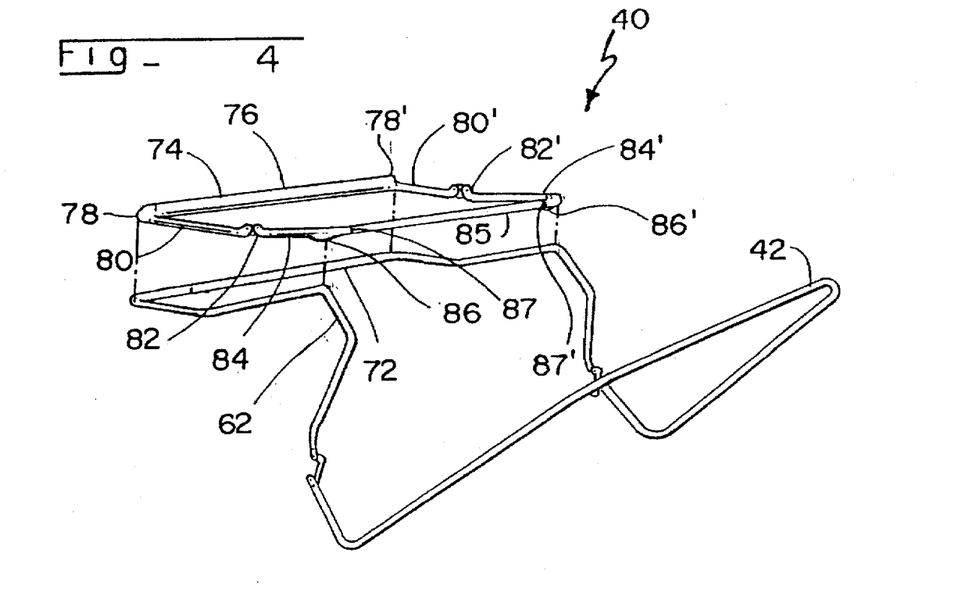
FIG. 4 is an exploded perspective view of the flexible-roof support shown in FIG. 1.

Exemplifying the present invention, flexible-roof support 40 is shown in FIGS. 1–5. FIGS. 1–3 and 5 show flexible-roof support 40 on vehicle 10. FIG. 4 shows flexible-roof support 40 off of the vehicle in an exploded perspective view. The dot-dash lines show the proper placement of the parts.

Flexible-roof support 40 is provided for supporting a flexible roof on vehicle 10 in a manner such that the roof may be closed to cover the entire passenger compartment, partially folded, or folded all the way open. The flexible material forming the roof is not shown in the drawings to allow a better view of flexible-roof support 40 and other parts of the vehicle. Flexible-roof support 40 may be made of plastic and/or metal.

Flexible-roof support 40 generally includes rear bow 42 which has elongated transverse middle member 44 substantially spanning the width of vehicle 10 and having two ends 46 and 46'. Rear bow 42 further has two L-shaped side arms 48 and 48', each side arm being attached to either end 46 or 46' of middle member 44. L-shaped side arms 48 and 48' each have a long leg, 50 and 50', respectively, connected to short legs 52 and 52', respectively, at elbows 54 and 54', respectively. Long legs 50 and 50' have distal ends, 56 and 56', respectively. Short legs 52 and 52' also have distal ends, which are designated by reference numeral 58. L-shaped side arms 48 and 48' are attached to middle member 44 at distal ends, 56 and 56', of long leg 50 and 50', respectively, such that L-shaped side arms 48 and 48' are alignable with sides 12 and 12' of vehicle 10 and the distal ends of short legs 52 and 52' are directed upwardly. The distal ends of short legs 52 and 52' are pivotally attached to the downwardly extending ends of C-shaped bar 30 at mounting bracket 60.

It should be mentioned here that one of ordinary skill in the art may notice variations on this theme, including the use of a single, solid extension of side bow 62, without the uphill slope shown in FIG. 2, such that there may not be any "sun roof" adaptation as shown in FIGS. 1–5. Furthermore, there may be additional bows necessary for vehicles with a longer flexible roof. Even though the Figures shown herein do not detail such possibilities, they are nevertheless contemplated by me. Generally, all these various embodiments would incorporate my nesting L-shaped bows in order to allow the bows to stack on top of, or near, each other, such that the bows (with its respective fabric roofing) can be either tucked on top of, or into, the vehicle body, out of the way at or below the beltline, and out of the view of the driver. It must also be understood that this invention can not be circumnavigated by placing part of the L-shaped bows above the beltline. The mounting bracket will need to accommodate these additional bows. It is envisioned that the mounting bracket may "wrap" around the side structural members and the L-shaped bows may be mounted only on the outside of the vehicle to facilitate nesting as the bows are put into the down position. Or, in the alternative, the L-shaped side bows may be attached to both sides of the bracket. With these thoughts in mind we'll now look at the other drawings.

Looking now at FIG. 2, flexible-roof support 40 includes two L-shaped side bows, designated by reference numeral 62. The side bows each have a short leg connected to a long leg at an elbow. The short and long legs of the side bows each have a distal end opposite the elbow. Side bow 62 is shown having short leg 64 with its distal end 66, and long leg 68 with its distal end 70. Preferably, the side bows are a one-piece construction. Shown in FIG. 4, and connecting the distal ends of the long legs of the side bows, is front bar 72 which spans the width of vehicle 10 near the top of windshield frame 22.

Near the distal ends of the short legs, the side bows are pivotally attached to vehicle 10 at a mounting bracket such that the side bows are alignable with sides 12 and 12', respectively, and the long legs of the side bows are alignable with the upper parts of door openings 14 and 14'. As mentioned above, the mounting bracket is attached to the downwardly extending ends of C-shaped bar 30. The mounting brackets, and, therefore, the pivot mounting of the sidearms, are above "belt line" 73 and behind the door openings of vehicle 10. The term "belt line" refers to the line where the flexible roof meets the vehicle body. Typically, the vehicle body is the "sheet metal" of the vehicle.

The flexible-roof support of the present invention may also be used on a vehicle that does not have a sports bar but has a rigid structure that is attached to the vehicle and projects above the belt line and behind the door openings. Such a rigid structure may be a part of a manufactured vehicle model or may be custom-added to a vehicle. The side bows are also attached to vehicle 10 such that, when the side bows and rear bow 42 are folded back, the L-shape of the side bows nests in the L-shape of side arms 48 and 48' of rear bow 42 so that total clearance is achieved, and the roof support frame 40 tucks away completely.

Flexible-roof support 40 also has front bow 74 which has elongated transverse member 76 having two ends 78 and 78' which substantially span the width of vehicle 10. When flexible-roof support 40 is closed, front bow 74 is nearer to the front end of vehicle 10 than is rear bow 42 and is aligned with the top of windshield frame 22. Also, when flexible-roof support 40 is closed, ends 78 and 78' of front bow 74 are adjacent to the distal ends of the long legs of the side bows. Front bow 74 and front bar 72 are attachable to windshield frame 22 using, e.g., a hinged peg connected to vehicle 10 near windshield frame 22 which snaps over front bow 74.

As is best shown in FIG. 4, ends 78 and 78' of front bow 74 are each attached to an end of elongated front bow arms 80 and 80', respectively. Front bow arms 80 and 80' are attached at their other ends to the pivot bracket in the area of bow pivots 82 and 82', respectively. Bow pivots 82 and 82' are, in turn, attached to one end of intermediate bow arms 84 and 84', respectively. At the bottom of the other ends of intermediate bow arms 84 and 84' are bow rests 86 and 86'. When flexible-roof support 40 is closed, bow rests 86 and 86' each rest on one of the long legs of the side bows.

Flexible-roof support 40 also has intermediate bow 85 which has an elongated transverse member having two ends 87 and 87' which substantially spans the width of vehicle 10. Intermediate bow 85 is attached at ends 87 and 87' to intermediate bow arms 84 and 84' above bow rests 86 and 86', respectively. When flexible-roof support 40 is in the closed position, intermediate bow 85 is adjacent to the long legs of the side bows at a more rearward location than front bow 74.

Typically, a canvas roof would be stretched between front bow 74 and the rear panel 24 over the roof support 40. The roof would also normally be attached to intermediate bow 85, the side bows, and rear bow 42 by straps and snaps, a fabric casing or the like.

FIGS. 1 and 2 show flexible-roof support 40 in the closed position on vehicle 10. Flexible-roof support 40 is designed so that front bow 74 may be folded back at bow pivots 82 and 82' to create a "sun roof" on vehicle 10. FIG. 3 shows front bow 74 partially folded back at bow pivots 82 and 82'. To fold front bow 74 back into the sun roof position, front bow 74 is first disconnected from vehicle 10 at the front. Front bow 74 and front bow arms 80 and 80' are then folded rearwardly onto intermediate bow arms 84 and 84' following the pattern of the dotted lines shown in FIG. 3. Once folded back, front bow 74 is preferably held in place by any suitable fastening means which will attach front bow 74 to flexible-roof support 40 which remains over the passenger compartment or to the flexible roof which remains over the passenger compartment. Such a fastener may include any fastening means, but is preferably by snaps.

In an alternative design, the front bow and the front bow arms as shown in the Figures could be eliminated. In this alternative design, each bow pivot would be attached to an end of a intermediate bow arm and to the long leg of a side arm. Front bar 72 would replace front bow 74 for holding one end of the flexible roof. This alternative design does not have the capability of partially folding back the front bow to create a sun roof.

To fold flexible-roof support 40 into the open position, front bow 74 and front bar 72 are first disconnected from the windshield frame 22 of vehicle 10. Next, front bow 74 and front bar 72 are lifted and pivoted toward rear end 20 of vehicle 10. As front bow 74 and front bar 72 are pivoted, front bow arms 80 and 80' and intermediate bow arm 84 and 84' pivot at pivots 82 and 82' and rear bow 42 also folds down. Finally, when flexible-roof support 40 is entirely folded down, as shown in FIG. 5, flexible-roof support 40 nests inside the rear and side panels 24, 26, and 26' and on top of the wheel house of vehicle 10 to minimize obstruction of the driver's view.

Figure 5:
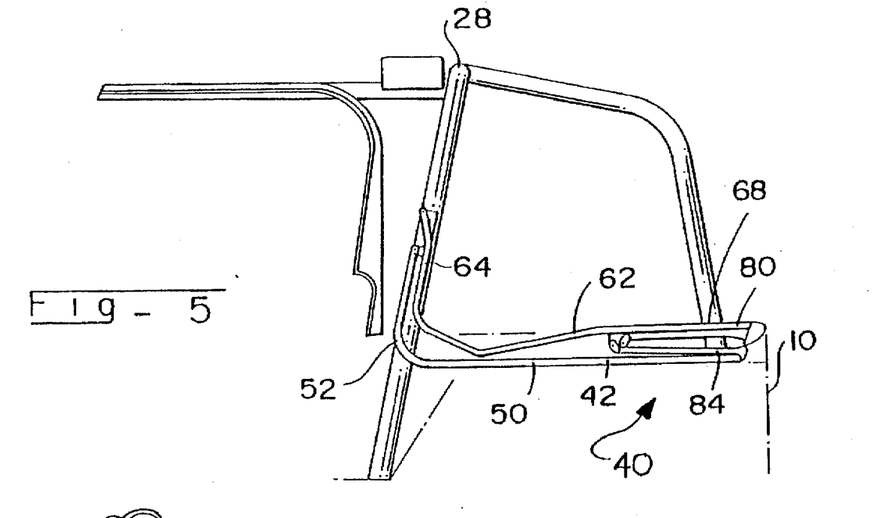
FIG. 5 is a side view of part of the utility vehicle of FIG. 1 wherein the flexible-roof support is in the open or folded down position.

It can be seen in FIG. 5 that rear bow 42 folds down first and short leg 52 of rear bow 42 aligns with sports bar 28 for minimal obstruction of the driver's view. Next, front bow arm 80 folds on top of intermediate bow arm 84, and both rest on top of long leg 50 of rear bow 42. On top of front bow arm 80 rests long leg 68 of slide bow 62. Short leg 64 of side bow 62 also aligns with sports bar 28 for minimal obstruction of the driver's view.

To close flexible-roof support 40 from the open position shown in FIG. 5, the steps described for opening flexible-roof support 40 are merely reversed. Front bow 74 and front bar 72 are lifted up and over sports bar 28. As front bow 74 and front bar 72 are lifted up and toward the front end of vehicle 10, the remaining bows follow as they are attached to the flexible roof. When flexible-roof support 40 is fully closed, front bow 74 and front bar 72 are attached to the top of windshield frame 22 to keep the flexible roof in place.

Figures 6, 7:
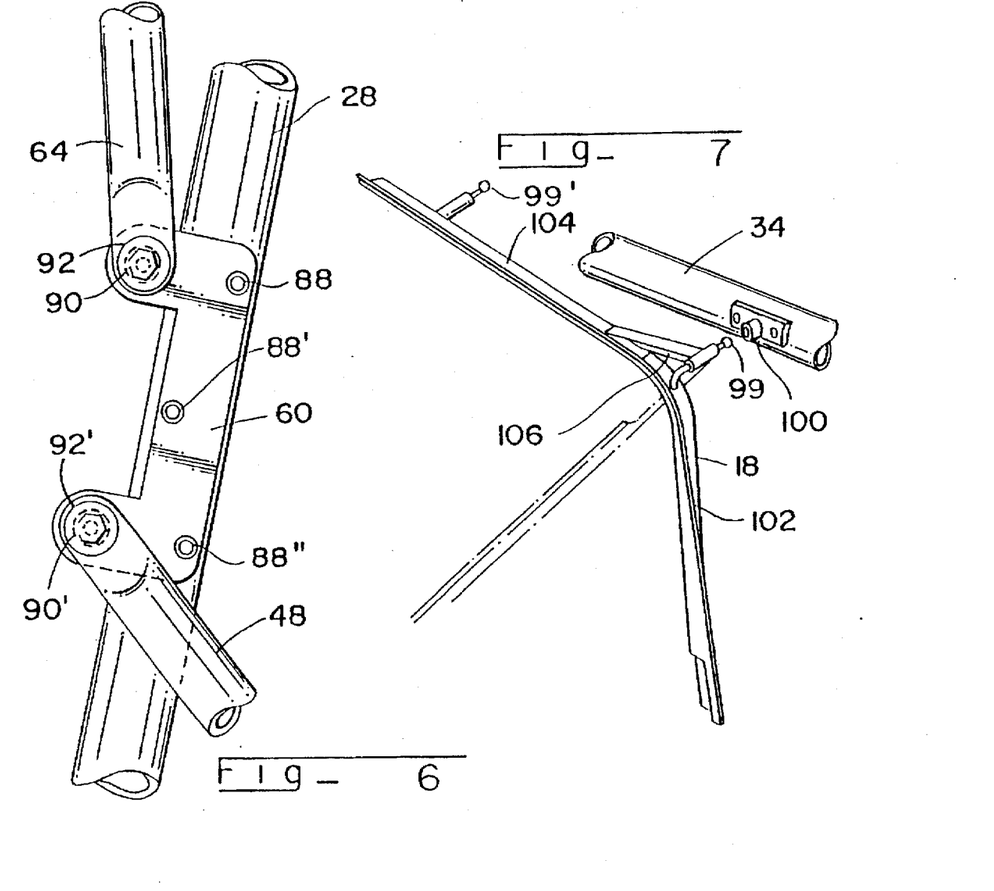
FIG. 6 is a side view of a mounting bracket which can be used with the flexible-roof support shown in FIGS. 1–5.
FIG. 7 is a perspective view of the removable door frame shown in FIGS. 1–3 and 5 which can be "plugged into" the cage support bar of the vehicle.

FIG. 6 shows a side view of a mounting bracket 60 attached to sports bar 28 with suitable attachment means, such as rivets. Attached to mounting bracket 60, using nuts and bolts, are side arm 48 of rear bow 42 and short leg 64 of side bow 62. Mounting bracket 60 is essentially U-shaped having three holes at 88, 88' and 88", triangularly located on the web of the "U" for attaching mounting bracket 60 to sports bar 28 and holes 90 and 90', one in each end of the "U" for attaching short leg 64 and side arm 48, respectively. Holes 90 and 90' are larger than the diameter of the bolts, allowing for adjustment of side arm 48 and short leg 64 in all directions along the plane of mounting bracket 60. Washers 92 and 92' are used over holes 90 and 90', respectively.

Referring to FIG. 7, there is depicted a removable door frame 18 which is provided so that when flexible-roof support 40 and the flexible roof (not shown) are open, the door and door frame may be removed, for a more open-air structure. Door frame 18 is preferably connected to cage support bar 34 using ball-and-socket fittings, although any other suitable fastening means may be used. Balls 99 and 99' are shown on door frame 18 and socket 100 and another socket (not shown) are on cage support bar 34. Methods other than using ball-and-socket fittings may be used to attach door frame 18 to cage support bar 34. In addition, door frame 18 may be attached to the side panel of vehicle 10 below door frame 18 by inserting a protrusion (not shown) on the bottom of door frame 18 into a recess (not shown) in the side panel. Door frame 18 provides a seal-mating surface to keep the interior of vehicle 10 water-tight and provides support for side bow 62.

Door frame 18 has doorjamb 102 which, when in place on vehicle 10, makes up the vertical rear side of door frame 18. Door frame 18 also has an upper-horizontal member 104 which, when in place on vehicle 10, makes up the upper horizontal side of door frame 18. Door frame 18 has hinge 106 between doorjamb 102 and upper-horizontal member 104 so that door frame 18 may be collapsed for easier storage, if desired.

Figure 8:
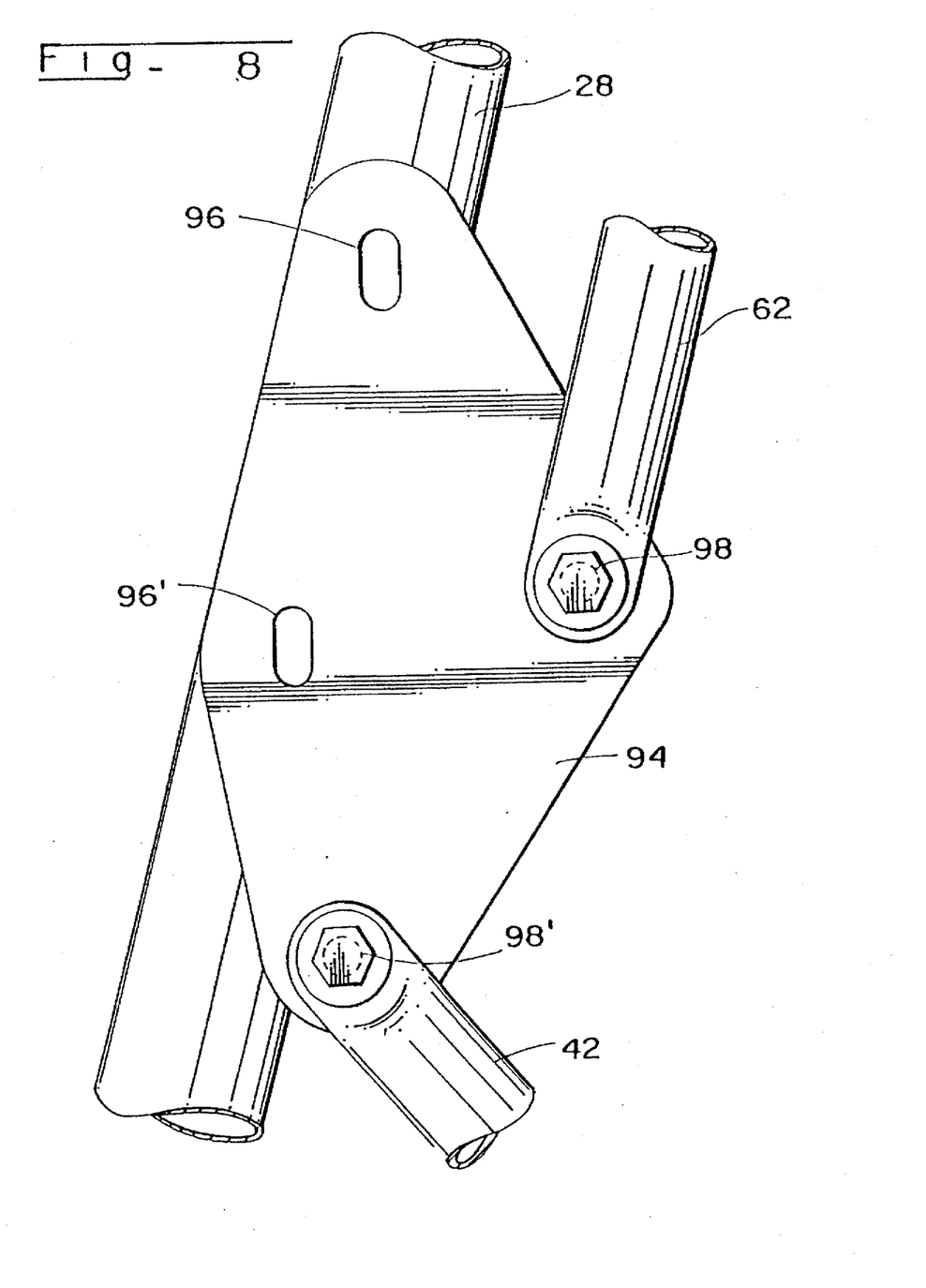
FIG. 8 is a side view of an alternative mounting bracket useful with the flexible-roof support of the present invention.

Looking now to FIG. 8, there is shown alternative mounting bracket 94 which could be used with the flexible-roof support 40 in place of mounting bracket 60. Mounting bracket 94 has holes 96 and 96' for attaching mounting bracket 94 to sports bar 28 using suitable means for attaching, such as rivets or nuts and bolts (not shown).

Mounting bracket 94 also has holes 98 and 98' for connecting side bow 62 and rear bow 42, respectively, to mounting bracket 94. Holes 98 and 98' are larger than the diameter of the bolts, allowing for adjustment of side bow 62 and rear bow 42 in all directions along the plane of mounting bracket 94. When mounted, holes 98 and 98' are positioned rearward of sports bar 28.

The present invention also contemplates other mounting brackets which would enable the L-shaped bows of the invention to tuck away in the closed position. One of ordinary skill in the art is familiar with numerous types of low tolerance-requiring mounting brackets that would achieve such a favorable result. Although only two embodiments are shown in the Figures and described, the possibilities are so numerous that I cannot cover them all. These two seem to be the easier to manufacture and install while achieving my purpose.

Accordingly, the convertible foldable flexible-roof support of the present invention is suitable for supporting a flexible roof for a vehicle, especially a utility vehicle. The flexible-roof support may be converted from the closed position to the open position and vice versa by folding or unfolding the flexible-roof support. The flexible-roof support of the present invention has a low number of parts and allows for high manufacturing tolerances so that it is easy to manufacture and easy to assemble. The flexible-roof support also minimally obstructs the driver's view while either in the closed position or the open position.

The present invention also offers a flexible-roof support which supports a flexible-roof which covers the entire passenger compartment and in which part of the flexible roof may be folded back into a sun roof and attached to the flexible roof or flexible-roof support which remains over the passenger compartment.

The present invention has been described in an illustrative manner. It is to be understood that the terminology which has been used is intended to be in the nature of words of description rather than of limitation.

As discussed above, many modifications and variations of the present invention are possible in light of the above teachings. Therefore, within the scope of the appended claims, the present invention may be practiced otherwise than as specifically described.

What is claimed is:

1. A foldable convertible flexible-roof support for a vehicle, the vehicle having a body, a belt line where the flexible roof meets the vehicle body, two sides and a door opening on each side of the vehicle, each door opening having an upper part, the flexible-roof support comprising:

two L-shaped side bows, each L-shaped side bow having a short leg, a long leg connected to the short leg, and an elbow where the short and long legs are connected, the long and short legs each having a distal end opposite the elbow, the distal ends of the short legs of the side bows being pivotally attachable to the vehicle above the belt line and behind the door openings of the vehicle, such that the side bows are alignable with the sides of the vehicle and the long legs of the side bows are alignable with the upper part of the door openings.

2. The foldable convertible flexible-roof support as set forth in claim 1, further comprising:

a rear bow having a transverse middle member substantially spanning the width of the vehicle and having two ends, the rear bow further having two L-shaped side arms, each L-shaped side arm attached to an end of the middle member, the L-shaped side arms each having a long leg, a short leg connected to the long leg, and an elbow where the long leg and the short leg are connected, the long and short legs each having a distal end opposite the elbow, the L-shaped side arms being attached to the middle member at the distal ends of the long legs such that the side arms are alignable with the sides of the vehicle and the distal ends of the short legs are directed upwardly and pivotally attachable to the vehicle.

3. The foldable convertible flexible-roof support as set forth in claim 2, further comprising:

a mounting bracket attachable to the vehicle to which the rear bow and one of the side bows are attachable, the mounting bracket having a first hole therein at the point of attachment for the rear bow and a second hole therein at the point of attachment for one of the side bows, and means for attaching the rear bow and one of the side bows to the mounting bracket, the holes in the mounting bracket being sized larger in the side-to-side direction and in the up-and-down direction than the attaching means to allow for adjusting the position of both the rear bow and the side bow on the vehicle.

4. The foldable convertible flexible-roof support as set forth in claim 1, further comprising a removable door frame for each door opening.

5. The foldable convertible flexible-roof support as set forth in claim 1, further comprising a front bow having a transverse member substantially spanning the width of the vehicle, the transverse member of the front bow having two ends, the front bow being connected as part of the flexible-roof support such that, when the flexible-roof support is in the closed position, the ends of the front bow are adjacent to the distal ends of the long legs of the side bows.

6. The foldable convertible flexible-roof support as set forth in claim 5, further comprising an intermediate bow having a transverse member having two ends and substantially spanning the width of the vehicle, and, when the flexible-roof support is in the closed position, the intermediate bow is adjacent to the long legs of the side bows at a more rearward location on the vehicle relative to the front bow.

7. The foldable convertible flexible-roof support as set forth in claim 5, further comprising two front bow arms and two bow pivots, each front bow arm being connected at one end to the front bow and each bow pivot being connected to the other end of one of the front bow arms, the front bow arms and the bow pivots present so that the front bow may be partially folded back.

8. The foldable convertible flexible-roof support as set forth in claim 7, further comprising two intermediate bow arms, each intermediate bow arm being attached at one end to one of the bow pivots.

9. A foldable convertible flexible-roof support for a vehicle, the vehicle having a body, a belt line where the flexible roof meets the vehicle body, two sides and a door opening on each side of the vehicle, the door openings each having an upper part, the flexible-roof support comprising:

a rear bow having a transverse middle member substantially spanning the width of the vehicle and having two ends, the rear bow further having two L-shaped side arms, each L-shaped side arm attached to an end of the middle member, the L-shaped side arms each having a long leg, a short leg connected to the long leg, and an elbow where the long leg and the short leg are connected, the long and short legs each having a distal end opposite the elbow, the L-shaped side arms being attached to the middle member at the distal ends of the long legs such that the L-shaped side arms are alignable with the sides of the vehicle and the distal ends of the short legs are directed upwardly and pivotally attachable to the vehicle; and two L-shaped side bows, each L-shaped side bow having a short leg, a long leg connected to the short leg, and an elbow where the long and short legs are connected, the long and short legs each having a distal end opposite the elbow, the distal ends of the short legs of the side bows being pivotally attachable to the vehicle above the belt line behind the door openings of the vehicle, such that the side bows are alignable with the sides of the vehicle and the long legs of the side bows are alignable with the upper part of the door openings, the side bows being attachable to the vehicle such that, when the side and rear bows are folded back, the L-shape of the side bows nests in the L-shaped side arms of the rear bows.

10. The foldable convertible flexible-roof support as set forth in claim 9, further comprising:

a mounting bracket attachable to the vehicle to which the rear bow and one of the side bows are attachable, the mounting bracket having a first hole therein at the point of attachment for the rear bow and a second hole therein at the point of attachment for one of the side bows, and means for attaching the rear bow and one of the side bows to the mounting bracket, the holes in the mounting bracket being sized larger in the side-to-side direction and in the up-and-down direction than the attaching means to allow for adjusting the position of both the rear bow and the side bow on the vehicle.

11. The foldable convertible flexible-roof support as set forth in claim 9, further comprising a removable door frame for each door opening.

12. The foldable convertible flexible-roof support as set forth in claim 9, further comprising a front bow having a transverse member substantially spanning the width of the vehicle, the transverse member of the front bow having two ends, the front bow being connected as part of the flexible-roof support such that the ends of the front bow are adjacent to the distal ends of the long legs of the side bows.

13. The foldable convertible flexible-roof support as set forth in claim 12, further comprising an intermediate bow having a transverse member having two ends and substantially spanning the width of the vehicle, and, when the flexible-roof support is in the closed position, the intermediate bow is adjacent to the long legs of the side bows at a more rearward location on the vehicle relative to the front bow.

14. The foldable convertible flexible-roof support as set forth in claim 12, further comprising two front bow arms and two bow pivots, each front bow arm being connected at one end to the front bow and each bow pivot being connected to the other end of one of the front bow arms, the front bow arms and the bow pivots present so that the front bow may be partially folded back.

15. The foldable convertible flexible-roof support as set forth in claim 14, further comprising two intermediate bow arms, each intermediate bow arm being attached at one end to one of the bow pivots.

16. A foldable convertible flexible-roof support for a vehicle, the vehicle having a body, a belt line where the flexible roof meets the vehicle body, two sides and a door opening on each side of the vehicle, each door opening having an upper part, the flexible-roof support comprising:

a rear bow having a transverse middle member having two ends and substantially spanning the width of the vehicle, the rear bow further having two L-shaped side arms, each L-shaped side arm attached to an end of the middle member, the L-shaped side arms each having a long leg, a short leg connected to the long leg, and an elbow where the long and short legs are connected, the long and short legs each having a distal end opposite the elbow, the L-shaped side arms being attached to the middle member at the distal ends of the long legs such that the L-shaped side arms are alignable with the sides of the vehicle and the distal ends of the short legs are directed upwardly and pivotally attachable to the vehicle;

two L-shaped side bows each having a short leg, a long leg connected to the short leg, and an elbow where the short and long legs are connected, the short and long legs each having a distal end opposite the elbow, the distal ends of the short legs of the side bows being pivotally attachable to the vehicle above the belt line and behind the door openings of the vehicle, such that the side bows are alignable with the sides of the vehicle and the long legs of the side bows are alignable with the upper part of the door openings, the side bows being attachable to the vehicle such that, when the side and rear bows are folded back, the L-shape of the side bows nests in the L-shaped side arms of the rear bows;

a front bow having a transverse member substantially spanning the width of the vehicle, the transverse member of the front bow having two ends, the front bow being connected as part of the flexible-roof support such that the ends of the front bow are adjacent to the distal ends of the long legs of the side bows; and an intermediate bow including a transverse member having two ends and substantially spanning the width of the vehicle, and, when the flexible-roof support is in the closed position, the intermediate bow is adjacent to the long legs of the side bows at a more rearward location on the vehicle relative to the front bow.

17. A flexible-roof support for supporting a flexible roof on a vehicle, the flexible roof capable of covering the entire passenger compartment, the flexible-roof support comprising:

a front bow having a transverse member which substantially spans the width of the vehicle and has two ends;

two elongated front bow arms, each front bow arm having two ends;

two bow pivots;

each end of the front bow being connected to an end of one of the front bow arms, and a bow pivot being connected to each front bow arm at the end opposite the connection to the front bow; and the front bow arms and the bow pivots being present so that the front bow may be folded back creating a sun roof on the vehicle.

* * * * *

US005673959B1

REEXAMINATION CERTIFICATE (4076th)

United States Patent [19]
Padlo

[11] B1 5,673,959
[45] Certificate Issued May 2, 2000

[54] FOLDABLE CONVERTIBLE FLEXIBLE-ROOF SUPPORT

[76] Inventor: Craig W. Padlo, 6947 White Pines Dr., Brighton, Mich. 48116

Reexamination Request:
No. 90/005,101, Sep. 11, 1998

Reexamination Certificate for:
Patent No.: 5,673,959
Issued: Oct. 7, 1997
Appl. No.: 08/345,936
Filed: Nov. 28, 1994

[51] Int. Cl.⁷ ........................................................ B60J 7/12
[52] U.S. Cl. ............................................ 296/116; 296/114
[58] Field of Search .................................... 296/109, 114, 296/118, 116, 107.01, 107.09, 107.16

[56] References Cited

U.S. PATENT DOCUMENTS

| | | |
|---|---|---|
| 974,072 | 10/1910 | Kenyon . |
| 1,722,227 | 7/1929 | Lukesh . |
| 1,741,318 | 12/1929 | Kroh . |
| 1,808,298 | 6/1931 | DuPont . |
| 2,580,337 | 12/1951 | Votypka . |
| 2,682,427 | 6/1954 | Bright . |
| 2,697,633 | 12/1954 | Slason . |
| 2,817,345 | 12/1957 | Woodruff, Sr. . |
| 2,823,684 | 2/1958 | Sartori . |
| 2,864,388 | 12/1958 | Oliver . |
| 2,893,782 | 7/1959 | Pollock . |
| 3,090,646 | 5/1963 | Johnson . |
| 3,127,525 | 3/1964 | Rabinovici . |
| 3,285,259 | 11/1966 | Hale . |
| 3,307,566 | 3/1967 | Hale . |

(List continued on next page.)

FOREIGN PATENT DOCUMENTS

| | | |
|---|---|---|
| 129392 | 7/1932 | Austria . |
| 0146884 A2 | 12/1984 | European Pat. Off. . |
| 1113961 | 4/1974 | France . |
| 129392 | 4/1902 | Germany . |
| 1152899 | 8/1963 | Germany . |
| 31 27 525 | 1/1983 | Germany . |
| 3127525 A1 | 1/1983 | Germany . |
| 4114823 A1 | 11/1992 | Germany . |
| 63-192631 | 8/1988 | Japan . |
| 1-164623 | 6/1989 | Japan . |
| 2-204129 | 8/1990 | Japan . |
| 6-106986 | 4/1994 | Japan . |
| 6-106989 | 4/1994 | Japan . |
| 6-106990 | 4/1994 | Japan . |
| 40651 | 5/1937 | Netherlands . |
| 652977 | 12/1985 | Switzerland . |
| 486283 | 6/1938 | United Kingdom . |
| 843638 | 3/1960 | United Kingdom . |
| 1209721 | 5/1969 | United Kingdom . |

OTHER PUBLICATIONS

Robert C. Akerson, Standard Catalog of 4×4's 1945–1993, pp. 385–415.

*Primary Examiner*—Joseph D. Pape

[57] ABSTRACT

A flexible-roof support for a vehicle. The vehicle has a door opening on each side, each door opening having an upper part. The flexible-roof support includes two side bows, each side bow having a short leg, a long leg, and an elbow where the short and long legs are connected, and distal ends opposite the elbow. The distal ends of the short legs are pivotally attachable to the vehicle above the belt line and behind the door openings, such that the side bows are alignable with the sides of the vehicle and the long legs of the side bows are alignable with the upper part of the door openings. Another embodiment is a flexible-roof support which includes a front bow, two front bow arms, each front bow arm having two ends and, two bow pivots, such that the support may be folded back to form a sun roof, to the flexible-roof support or to a portion of the flexible roof which remains over the passenger compartment. The front bow has a member which substantially spans the width of the vehicle and has two ends. Each end of the front bow is connected to an end of one of the front bow arms. At the other end of each of the front bow arms, A bow pivot is connected.

U.S. PATENT DOCUMENTS

| Patent No. | Date | Inventor |
|---|---|---|
| 3,328,073 | 6/1967 | Einhorn . |
| 3,357,738 | 12/1967 | Bourlier . |
| 3,367,349 | 2/1968 | O'Link . |
| 3,371,672 | 3/1968 | Hale . |
| 3,536,354 | 10/1970 | Ingram . |
| 3,584,912 | 6/1971 | Leger . |
| 3,773,379 | 11/1973 | Loiseau . |
| 3,994,524 | 11/1976 | Lehmann . |
| 4,066,292 | 1/1978 | Carli . |
| 4,114,823 | 9/1978 | Fecker . |
| 4,260,188 | 4/1981 | Bauer . |
| 4,310,194 | 1/1982 | Biller . |
| 4,402,544 | 9/1983 | Artim et al. . |
| 4,440,436 | 4/1984 | Giddens et al. . |
| 4,593,641 | 6/1986 | Adams et al. . |
| 4,639,034 | 1/1987 | Amos . |
| 4,729,593 | 3/1988 | Nisiguchi et al. . |
| 4,789,196 | 12/1988 | Fields . |
| 4,828,317 | 5/1989 | Muscat . |
| 4,850,634 | 7/1989 | Taubitz . |
| 4,898,420 | 2/1990 | Takada . |
| 4,915,440 | 4/1990 | Daniel et al. . |
| 4,927,202 | 5/1990 | Wagner . |
| 4,930,835 | 6/1990 | Bruce et al. . |
| 4,962,960 | 10/1990 | Wurl et al. . |
| 4,964,669 | 10/1990 | Geier . |
| 5,004,291 | 4/1991 | Bauer et al. . |
| 5,005,896 | 4/1991 | Li . |
| 5,033,787 | 7/1991 | Takada . |
| 5,033,788 | 7/1991 | Raj . |
| 5,042,868 | 8/1991 | Nothaft et al. . |
| 5,052,747 | 10/1991 | Kubota et al. . |
| 5,054,847 | 10/1991 | Asoh et al. . |
| 5,058,943 | 10/1991 | Louderback . |
| 5,066,063 | 11/1991 | Mullally . |
| 5,072,987 | 12/1991 | Allen . |
| 5,154,479 | 10/1992 | Sautter, Jr. . |
| 5,169,206 | 12/1992 | Omoto et al. . |
| 5,238,288 | 8/1993 | Chandler . |
| 5,267,771 | 12/1993 | Rothe . |
| 5,299,850 | 4/1994 | Kaneko et al. . |
| 5,303,667 | 4/1994 | Zirkelbach et al. . |
| 5,328,229 | 7/1994 | Brandt et al. . |
| 5,385,377 | 1/1995 | Girard . |
| 5,435,615 | 7/1995 | Schmitz . |
| 5,489,146 | 2/1996 | Fischbach . |
| 5,531,497 | 7/1996 | Cheng . |
| 5,540,476 | 7/1996 | Cowsert . |
| 5,544,934 | 8/1996 | Murkett et al. . |
| 5,556,156 | 9/1996 | Kirk . |
| 5,765,903 | 6/1998 | Essig et al. . |

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 9–16 is confirmed.

Claim 1 is cancelled.

Claims 2, 4, 5 and 17 are determined to be patentable as amended.

Claims 3 and 6–8, dependent on an amended claim, are determined to be patentable.

2. [The] *A* foldable convertible flexible-roof support [as set forth in claim 1, further comprising] *for a vehicle, the vehicle having a body, a belt line where the flexible roof meets the vehicle body, two sides and a door opening on each side of the vehicle, each door opening having an upper part, the flexible-roof support comprising: two L-shaped side bows, each L-shaped side bow having a short leg, a long leg connected to the short leg, and an elbow where the short and long legs are connected, the long and short legs each having a distal end opposite the elbow, the distal ends of the short legs of the side bows being pivotally attachable to the vehicle above the belt line and behind the door openings of the vehicle, such that the side bows are alignable with the sides of the vehicle and the long legs of the side bows are alignable with the upper part of the door openings, and* a rear bow having a transverse middle member substantially spanning the width of the vehicle and having two ends, the rear bow further having two L-shaped side arms, each L-shaped side arm attached to an end of the middle member, the L-shaped side arms each having a long leg, a short leg connected to the long leg, and an elbow where the long leg and the short leg are connected, the long and short legs each having a distal end opposite the elbow, the L-shaped side arms being attached to the middle member at the distal ends of the long legs such that the side arms are alignable with the sides of the vehicle and the distal ends of the short legs are directed upwardly and pivotally attachable to the vehicle.

4. [The] *A* foldable convertible flexible-roof support [as set forth in claim 1, further comprising] *for a vehicle, the vehicle having a body, a belt line where the flexible roof meets the vehicle body, two sides and a door opening on each side of the vehicle, each door opening having an upper part, the flexible-roof support comprising: two L-shaped side bows, each L-shaped side bow having a short leg, a long leg connected to the short leg, and an elbow where the short and long legs are connected, the long and short legs each having a distal end opposite the elbow, the distal ends of the short legs of the side bows being pivotally attachable to the vehicle above the belt line and behind the door openings of the vehicle, such that the side bows are alignable with the sides of the vehicle and the long legs of the side bows are alignable with the upper part of the door openings, and a removable door frame for each door opening.*

5. The foldable convertible flexible-roof support as set forth in claim [1] *2* further comprising a front bow having a transverse member substantially spanning the width of the vehicle, the transverse member of the front bow having two ends, the front bow being connected as part of the flexible-roof support such that, when the flexible-roof support is in the closed position, the ends of the front bow are adjacent to the distal ends of the long legs of the side bows.

17. *A flexible-roof support for supporting a flexible roof on a vehicle, the flexible roof capable of covering the entire passenger compartment, the flexible roof support comprising:*

*two L-shaped side bows, each L-shaped side bow having a short leg, a long leg connected to the short leg, and an elbow where the long and short legs are connected, the long and short legs each having a distal end opposite the elbow, the distal ends of the short legs of the side bows being pivotally attachable to the vehicle above the belt line behind the door openings of the vehicle, such that the side bows are alignable with the sides of the vehicle and the long legs of the side bows are alignable with the upper part of the door openings,*

*a cross member connecting the distal ends of the long legs of said L-shaped side bows, said cross member substantially spanning the width of the vehicle,*

*a front bow having a transverse member which substantially spans the width of the vehicle and has two ends;*

*two elongated front bow arms, each front bow arm having two ends;*

*two bow pivots;*

*each end of the front bow being connected to an end of one of the front bow arms, and a bow pivot being connected to each front bow arm at the end opposite the connection to the front bow;* [and]

*said front bow positioned substantially adjacent to and coplaner with said long legs of said L-shape side bows and said cross member, and*

*the front bow arms and the bow pivots being present so that the front bow may be folded back creating a sunroof on the vehicle.*

\* \* \* \* \*